United States Patent [19]

Just

[11] Patent Number: 5,417,951
[45] Date of Patent: May 23, 1995

[54] PROCESS FOR THE HYDROTHERMAL PRODUCTION OF CRYSTALLINE SODIUM DISILICATE

[75] Inventor: Guenther Just, Hilden, Germany

[73] Assignee: Henkel Kommanditgesellschaft auf Aktien, Duesseldorf, Germany

[21] Appl. No.: 70,474

[22] PCT Filed: Nov. 22, 1991

[86] PCT No.: PCT/EP91/02202
§ 371 Date: Jun. 1, 1993
§ 102(e) Date: Jun. 1, 1993

[87] PCT Pub. No.: WO92/09526
PCT Pub. Date: Jun. 11, 1992

[30] Foreign Application Priority Data

Dec. 1, 1990 [DE] Germany .................... 40 38 388.1

[51] Int. Cl.$^6$ ............................................. C01B 33/32
[52] U.S. Cl. .................................. 423/334; 423/332; 423/333; 23/302 T
[58] Field of Search ............... 423/335, 332; 23/302 T

[56] References Cited

U.S. PATENT DOCUMENTS

| | | | |
|---|---|---|---|
| 2,881,049 | 4/1959 | Erbe et al. | 23/110 |
| 4,336,235 | 6/1982 | Deabriges | 423/332 |
| 5,211,930 | 5/1993 | Schimmel et al. | 423/334 |
| 5,236,682 | 8/1993 | Schimmel et al. | 423/332 |
| 5,268,156 | 12/1993 | Schimmel et al. | 423/333 |

FOREIGN PATENT DOCUMENTS

| | | |
|---|---|---|
| 0320770 | 6/1989 | European Pat. Off. |
| 3100942 | 7/1982 | Germany |
| 3417649 | 11/1985 | Germany |

OTHER PUBLICATIONS

*Glastechnische Berichte* 37 (1964), 194–200.
*American Mineralogist*, 62 (1977), 763–771.

Primary Examiner—Anthony McFarlane
Attorney, Agent, or Firm—Wayne C. Jaeschke; Norvell E. Wisdom, Jr.; Daniel S. Ortiz

[57] ABSTRACT

The invention is a process for the hydrothermal production of crystalline sodium disilicate by heating an aqueous mixture of quartz sand and sodium hydroxide or an aqueous solution of sodium disilicate with a solids content of at least 50% by weight or more than 75% by weight at a temperature above 235° C. and under autogenous pressure to form crystalline sodium disilicate.

12 Claims, No Drawings

PROCESS FOR THE HYDROTHERMAL PRODUCTION OF CRYSTALLINE SODIUM DISILICATE

FIELD OF THE INVENTION

This invention relates to a process for the hydrothermal production of crystalline sodium disilicate from quartz sand and sodium hydroxide and/or from aqueous solutions of amorphous sodium disilicate.

STATEMENT OF RELATED ART

Crystalline sodium salts of silicas with an $SiO_2$ to $Na_2O$ ratio of 2:1 to 3:1 are normally produced by tempering sodium silicate glasses or by heating sodium carbonate and quartz (DE-OS 31 00 942).

Willgallis and Range (*Gastechnische Berichte* [Title in English: Glass Technology Reports] 37 (1964), 194–200) describe the production of $\alpha,\beta$- and $\gamma$-$Na_2Si_2O_5$ by tempering molten and non-molten, water-free soda waterglass. These products have a layer structure. The fact that they are crystalline forms is apparent from the X-ray diffraction spectra. The authors show that various crystal forms are obtained, depending on the temperature.

In *Am. Mineral.*, 62 (1977), 763–771, Benecke and Lagaly describe a process for the production of a hydrated crystalline sodium silicate of kanemite structure (approximately the composition $NaHSi_2O_5$). In a first step, $SiO_2$ is dispersed in methanol and cold sodium hydroxide is added to the resulting dispersion. This process is complicated by the controlled addition of the individual substances and necessitates special safety precautions on account of the use of inflammable methanol.

DE-OS 34 17 649 describes a process in which crystal nuclei are added to hydrated sodium silicate, the reaction mixture is dewatered by heating and the dewatered reaction mixture is kept at a temperature of at least 450° C., but below the melting point, until the crystalline sodium silicate of layer structure has formed.

Amorphous products are obtained in the dewatering (evaporation) of waterglass solutions or solutions of typical sodium silicates (non-layer-structure) with a molar ratio of $SiO_2$ to $Na_2O$ of 1.9:1 to 3.5:1. It is only at temperatures above 450° C. that these products crystallize over a period of several hours in the presence of an aqueous phase (DE-OS 34 17 649). This reaction generally takes several hours. At temperatures between 600° and 850° C., reaction times of only a few minutes and, in the case of certain silicates, fractions of a minute are occasionally sufficient.

EP-A 0 320 771) describes a process for the production of X-ray crystalline sodium disilicate (sodium silicate of layer structure) by dissolution of X-ray crystalline layer silicate in water and subsequent concentration by evaporation at elevated temperature. This process actually starts out from crystalline sodium layer silicate and is specifically intended for the production of detergents and cleaning products containing sodium disilicate. This document merely describes a method of processing crystalline sodium disilicate initially obtained by other processes by dissolution in water and subsequent evaporation of water.

It is equally well known to the expert that the dissolution of amorphous sodium disilicate in water and subsequent concentration by evaporation leads in turn to amorphous sodium disilicate.

It has not so far been possible by known methods directly to obtain highly pure crystalline sodium disilicate under hydrothermal conditions on an industrial scale.

J. Franke (Bull. Soc. Chim., 1950 pages 454 et seq.) describes attempts at the hydrothermal production of sodium disilicate. To isolate the reaction product of quartz and sodium hydroxide solution, the author attempted to crystallize the reaction product using expensive apparatus, in some cases by introducing crystallization nuclei. The reaction products obtained were then left to crystallize for several weeks while cooling, mixtures of amorphous and crystalline sodium disilicate often being obtained.

DESCRIPTION OF THE INVENTION

OBJECT OF THE INVENTION

Now, the problem addressed by the present invention was to provide a simple process which would enable crystalline, high-purity sodium disilicate to be produced in a single step from quartz sand and sodium hydroxide solution and/or aqueous solutions of amorphous sodium disilicate.

SUMMARY OF THE INVENTION

It has now surprisingly been found that solid, crystalline and high-purity sodium disilicate is produced in the hydrothermal reaction of quartz sand and sodium hydroxide and/or in aqueous solutions of amorphous sodium disilicate under limited concentration and temperature conditions, provided that crystalline sodium disilicate is isolated from the crystal suspension formed (suspension process). In addition, it has surprisingly been found that high total solids concentrations can be processed providing a suitable reactor is used, thus enabling powder-form crystalline sodium disilicate to be directly obtained (solid process).

According to the invention, the problem stated above has been solved by a process for the hydrothermal production of crystalline sodium disilicate with a molar ratio of $Na_2O$ to $SiO_2$ of 1:2 at elevated temperature and under the pressure corresponding to that temperature in a pressure vessel, characterized in that quartz sand and sodium hydroxide and/or an aqueous solution of amorphous sodium disilicate is heated in a first step to at least 235° C. and either (a) with a total solids concentration of 50 to 75% by weight, the total solids content may optionally be concentrated in a second step by removal of water from the reaction mixture, the quantity of water removed in the second step may be completely or partly re-added during or immediately after the subsequent cooling to 90°–130° C. in a third step, depending on how the second step is carried out, and the crystalline sodium disilicate produced is subsequently removed from the suspension or (b) with a total solids concentration of more than 75% by weight, the total solids content is optionally concentrated to as high as 100% by weight in a second step by removal of water from the reaction mixture and the crystalline sodium disilicate produced is present as a solid after subsequent cooling.

DESCRIPTION OF PREFERRED EMBODIMENTS

Suspension Process

In the suspension process, quartz sand and sodium hydroxide and/or an aqueous solution of amorphous sodium disilicate with a total solids concentration of 50 to 75% by weight is heated to at least 235° C. in a first step, in a second step, the total solids content may optionally be concentrated by removal of water from the reaction mixture and, depending on how the second step is carried out, the quantity of water removed in the second step may be completely or partly re-added in a third step during or immediately after the subsequent cooling to 90° to 130° C. The crystalline sodium disilicate produced is then removed from the suspension.

The process according to the invention may be carried out both continuously and discontinuously.

The lower limit to the total solids concentration is 50% by weight. By total solids concentration is meant the percentage content of the total solids $SiO_2$ and $Na_2O$ (calculated from NaOH) used, i.e. in the case of aqueous solutions of amorphous sodium disilicate, the percentage content of solids therein or, in the case of mixtures of quartz sand, sodium hydroxide and aqueous solutions of amorphous sodium disilicate, the sum total of all the solids present therein.

This is a concentration range in which highly viscous, substantially non-flowable and difficult-to-handle pastes are formed during cooling. Through the precipitation of considerable quantities of crystalline sodium disilicate during the reaction, there is a reduction in the concentration of the solution. The resulting suspension can still be handled and filtered.

In the suspension process, the upper limit to the total solids concentration of 75% by weight is imposed by the limits of processing. Total solids concentrations of the mixtures or solutions used of 60 to 70% by weight are of particular practical significance. Although the yield of crystalline sodium disilicate continues to increase at total solids concentrations above 75% by weight, wall deposits are also formed to an increased extent and can only be avoided by a specially designed apparatus of the type used in the solid process.

The first step of the process corresponds to a digestion reaction which is carried out at a temperature of at least 235° C. in a pressure vessel (autoclave/stirred autoclave). The reaction time required to obtain a quantitative conversion at that temperature is 2 to 3 hours. A conversion of quartz sand of around 99% can be obtained after a reaction time of only 30 minutes. Conversions of more than 99.9% can be obtained in accordance with the invention.

In general, the reaction time decreases with increasing reaction temperature, although the reaction temperature should be kept in the range from 235° to 300° C. and, more particularly, in the range from 250° to 280° C. in order to keep the technical effort involved in the process within practicable limits. Nevertheless, the reaction may always be carried out at a reaction temperature above 300° C. This is particularly of interest when short reaction times are to be obtained, as is the case where the process is carried out continuously.

In a batch considered in isolation, the average yield of crystalline sodium disilicate is 50 to 60% of the total solids used. The rest is substantially present as amorphous sodium disilicate in dissolved form and accumulates as filtrate during the filtration process. This filtrate may optionally be reintroduced into the process after concentration to the necessary concentration range to the extent that it has no other potential use (Example 3). In this case, it is again important to ensure that a total solids concentration of at least 50% by weight is maintained in the mixture formed. The desired concentration may optionally be established by removing the calculated quantity of water during heating to the reaction temperature. The yield of crystalline sodium disilicate, from such mixtures of recovered solutions of amorphous sodium disilicate, quartz sand and sodium hydroxide, likewise amounts to 50 to 60%. In this way, there is gradually a complete conversion into crystalline product.

Where aqueous solutions of amorphous sodium disilicate are used, the foregoing observations in regard to the concentration and temperature ranges again apply. The solution may have to be adapted to the concentration requirements by concentration. However, the time required is considerably less than in the digestion of quartz and the yield of crystalline sodium disilicate is somewhat lower at around 45%. However, it can be increased by introducing crystalline sodium disilicate as nucleants and then amounts to around 50%. This procedure is particularly suitable for continuous operation.

According to the invention, the process may also be carried out by increasing the total solids concentration by removal of water from the reaction mixture in a second step following the first step. The water issuing from the reaction vessel as steam is condensed and may be completely or partly re-added to the reaction mixture at a later stage in a third step. This third step is generally carried out during or immediately after cooling. The effect of concentration is that the total solids concentration is increased by another 5 to 10% by weight, so that the yield of crystalline sodium silicate is further increased beyond 60% by crystallization.

The reaction mixture may also be concentrated during heating to the reaction temperature. This can be of advantage in particular when the total solids concentrations of the mixtures used are low (Examples 3 and 4).

Before working up, but during or immediately after cooling when the reaction mixture has a temperature between 90° and 130° C., the quantity of water removed is re-added so that the mixture becomes easy to handle again.

Further working up is then carried out by removing the crystalline sodium disilicate from the mother liquor, more particularly by filtration at a temperature in the range from 100° to 130° C. Heated filter presses or pressure suction filters, in which the mother liquor is filtered through an alkali-resistant filter cloth, preferably at 2 to 3 bars, have proved to be particularly suitable for this purpose. The filter units are best purged with steam under a pressure of 2 bars to displace residues of the solution. The filter cake accumulating still has a water content of around 15% by weight. After size reduction of the filter residue, the water content may if desired be reduced to around 2% by weight, for example by treatment with hot air in a fluidized bed dryer. Drying may be followed by grinding and/or sieving.

The crystalline sodium disilicate thus obtained has a purity of more than 90% and consists of the β form (low-temperature form), as shown by X-ray diffractograms.

Solid process

Whereas, in the suspension process, the absolute upper limit to the solids concentration is 75% by weight, solids concentrations of up to 100% by weight can be handled in the solid process. In the solid process, quartz sand and sodium hydroxide and/or an aqueous solution of amorphous sodium disilicate having a total solids concentration of more than 75% by weight is heated to at least 235° C. in a first step. The reaction temperature is preferably between 235° C. and 300° C. and, more preferably, between 250° C. and 280° C. In a second step, the total solids content may optionally be concentrated to as high as 100% by weight by removal of water from the reaction mixture. However, concentration may also be carried out during heating of the reaction mixture, as already described for the suspension process. The crystalline sodium disilicate formed is then removed as a solid.

To process total solids concentrations of more than 75% by weight, it is preferred to carry out the process in a combination of two known apparatuses, namely a roller autoclave and a ball mill (Example 5).

The apparatus is essentially a commercially available heatable roller autoclave designed for relatively high pressures, i.e. a pressure-tight cylindrical hollow vessel which rotates about its own axis. The particular feature is that the roller autoclave is partly filled with grinding balls of ceramic or metal.

The quantity of balls with which the autoclave is charged is between 5 and 20% by volume and preferably between 5 and 10% by volume and is dependent upon the particular problem to be solved. A small quantity is desirable so that as much space as possible is available for the reaction. The size of the balls is also determined by the problem to be solved. However, preference is attributed to relatively large and hence relatively heavy balls by virtue of the greater grinding effect. The rotational speed is adjusted to a low value to protect the autoclave. A possible inner lining of replaceable wear plates is used for the same purpose.

With an apparatus of the type in question, it is possible with advantage to carry out reactions at relatively high temperatures and under relatively high pressures which go along with troublesome agglomeration or wall deposits and, in particular, make the "concentration by evaporation to dryness", i.e. high total solids concentrations, controllable in many cases. However, there are also cases where the desired effect does not occur on account of the product properties. Accordingly, this combination of apparatuses has to be tested for its suitability from case to case. The reaction time required to obtain a quantitative conversion is between 1 and 3 h.

If total solids concentrations of more than 75% by weight and preferably more than 90% by weight are used in the ball-filled roller autoclave process, yields of up to 100% of crystalline disilicate can be obtained.

Crystalline, free-flowing sodium disilicate is directly obtained by the solid process and has to be removed from the autoclave by suitable measures. The balls added can be recovered by sieving.

The crystalline sodium disilicate obtained has a purity of more than 95% and consists of the $\beta$ form (low-temperature form), as shown by X-ray diffractograms.

EXAMPLES

The following Examples are intended to illustrate the process according to the invention without limiting it in any way.

Example 1

The hydrothermal silicate synthesis and the crystalline conversion were carried out in a nickel-plated, 5 liter stirred autoclave designed for a temperature of up to 350° C. and a pressure of up to 300 bar and equipped with an anchor stirrer and electrical heating.

To this end, the autoclave was filled with 1.6 kg of sodium hydroxide (50% by weight), 0.25 kg of water and 1.2 kg of quartz sand (particle size 0.1 to 0.7 mm) and heated to 250° C. After a reaction time of 2 h, the contents of the autoclave were cooled and emptied at around 100° C. A fine-particle, medium-viscosity suspension having a solids content of 60% by weight was obtained.

To isolate the crystalline sodium disilicate component, the suspension was filtered through a heated pressure suction filter with fine-mesh polypropylene cloth under a pressure of 2 to 3 bars, after which steam under a pressure of 2 bars was blown through the filter cloth to displace adhering solution. The filter cake accumulating, which had a water content of approximately 15% by weight, was then size reduced and dried in this form with hot air to a water content of approximately 2% by weight. Finally, grinding and sieving produced 0.98 kg of crystalline sodium disilicate as the end product. According to an X-ray diffractogram, the sodium disilicate was pure crystalline sodium disilicate in the $\beta$ form. The yield of crystalline product was 51% The resulting mother liquor weighed 1.95 kg and contained 0.88 kg of amorphous disilicate, corresponding to a solids content of 45% by weight.

Example 2

The apparatus of Example 1 was filled with 1.6 kg of sodium hydroxide (50% by weight) and 1.2 kg of quartz sand, heated to 250° C. and kept at that temperature for 2 h. Before cooling, 0.2 kg of water was distilled off so that the total solids concentration was increased from 65% by weight to 70% by weight. After cooling to around 100° C., 0.2 kg of water was returned to the mixture, which was then worked up. A yield of crystalline sodium disilicate of 58% was obtained.

Example 3

The apparatus of Example 1 was filled with 1.9 kg of mother liquor (45% by weight of solids content as amorphous sodium disilicate), 0.85 kg of sodium hydroxide (50% by weight) and 0.64 kg of quartz sand. During heating to 250° C., 0.6 kg of water was distilled off. After a reaction time of 2 hours, the reaction mixture was cooled and then worked up as described in Example 1. The yield of crystalline product was 55%.

Example 4

The apparatus of Example 1 was filled with 3.5 kg of a 50% by weight aqueous solution of amorphous sodium disilicate and 0.8 kg of water was distilled off during heating to 250° C. After a reaction time of 20 minutes, the reaction mixture was cooled and worked up as described in Example 1. The yield of crystalline product was 44%.

Example 5

A 370 liter nickel-plated roller autoclave was filled with 30 l (65 kg) of aluminum oxide balls (38 mm in diameter). The autoclave was then filled with 85.7 kg of quartz sand (particle size 0.1 to 0.5 mm) and 114.3 kg of sodium hydroxide (50% by weight), closed, gas-heated to 250° C. at a rotational speed of 5 r.p.m. and kept at that temperature for 1 h.

About 70 l of water are then distilled off at a temperature above 200° C. and, after a cooling phase, the autoclave is opened and its contents emptied by filtration under suction. The yield is 125 kg, including 115 kg with a particle size of 0.1 to 0.2 mm. The remainder has larger particle sizes, but can be reduced by grinding to fine particles.

According to an X-ray diffractogram, the sodium disilicate obtained is predominantly crystalline sodium disilicate in the $\beta$ form. The calcium binding power of the product, expressed in mg CaO per gram of active substance, is about 190.

The invention claimed is:

1. A process for the hydrothermal production of solid, crystalline sodium disilicate in the $\beta$ form with a molar ratio of $Na_2O$ to $SiO_2$ of 1:2, said process comprising steps of:
   (a) reacting a mixture of quartz sand and sodium hydroxide, and, optionally, an aqueous solution of amorphous sodium disilicate in a pressure vessel at a temperature of at least 235° C. and under the water vapor pressure corresponding to that temperature,
   (a) said mixture having a molar ratio of $Na_2O$ to $SiO_2$ of 1:2 and a total solids concentration of more than 75% by weight, for a sufficient time to form crystalline sodium disilicate;
   (b) concentrating the total solids content of the mixture of step (a) by removal of water from the mixture; and
   (c) cooling the solid crystalline sodium disilicate produced.

2. A process as claimed in claim 1, wherein a ball-containing roller autoclave is used as the pressure vessel.

3. A process as claimed in claim 2, wherein the reaction temperature is in the range from 250° to 280° C.

4. A process as claimed in claim 3, wherein concentration is carried out by removal of water during the heating of the mixture of step (a).

5. A process as claimed in claim 2, wherein the reaction temperature is in the range from 235° to 300° C.

6. A process as claimed in claim 1, wherein the reaction temperature is in the range from 235° to 300° C.

7. A process as claimed in claim 6, wherein the reaction temperature is in the range from 250° to 280° C.

8. A process as claimed in claim 7, wherein concentration is carried out by removal of water during the heating of the mixture of step (a).

9. A process as claimed in claim 6, wherein concentration is carried out by removal of water during the heating of the mixture of step (a).

10. A process as claimed in claim 5, wherein concentration is carried out by removal of water during the heating of the mixture of step (a).

11. A process as claimed in claim 2, wherein concentration is carried out by removal of water during the heating of the mixture of step (a).

12. A process as claimed in claim 1, wherein concentration is carried out by removal of water during the heating of the mixture of step (a).

* * * * *